Patented Mar. 31, 1953

2,633,468

UNITED STATES PATENT OFFICE

2,633,468

BENZOOXAHETEROCYCLIC BASES AND ACID ADDITION SALTS THEREOF

Albert Pohland, Indianapolis, Ind., assignor to Eli Lilly and Company, Indianapolis, Ind., a corporation of Indiana No Drawing. Application July 26, 1951, Serial No. 238,779

7 Claims. (Cl. 260—294.7)

This invention relates to certain novel organic chemical compounds and their preparation, and more particularly to certain benzooxaheterocyclic bases, and their acid addition salts, and to processes for their preparation.

The compounds of this invention may be represented in the form of their salts by the following formula

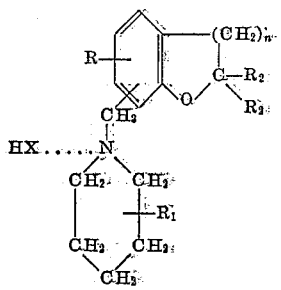

wherein R represents a substituent in the benzene ring which is a hydroxyl group, a lower alkyl radical, i. e., an alkyl radical having from 1 to 7 carbon atoms, or a benzo grouping, i. e., a 4-carbon chain attached through its terminal carbon atoms to adjacent carbon atoms of the benzene ring; $R_1$ represents a lower alkyl radical; $R_2$ represents hydrogen or methyl; $n$ is 1 or 2; and HX represents an equivalent of an acid when the compound is in the form of an acid addition salt.

Illustrative examples of new bases included within the scope of this invention are the following compounds:

2-methyl-5-ethyl-7-(2-pipecolinomethyl)-coumaran 2,2-dimethyl-5-ethyl-7-(2-pipecolinomethyl)-coumaran 5-methyl-7-(2-pipecolinomethyl)-coumaran 5-n-propyl-7-(2-ethylpiperidinomethyl)-coumaran 2,2-dimethyl-6-ethyl-8-(2-pipecolinomethyl)-chroman 5-n-hexyl-7-(2-n-propylpiperidinomethyl)-coumaran 2-methyl-5-ethyl-7-(4-methylpiperidinomethyl)-coumaran 2-methyl-7-(2-pipecolinomethyl)-5,6-benzocoumaran 5-(3-ethylpiperidinoethyl)-coumaran 2-methyl-5-ethyl-8-(3-pipecolinomethyl)-chroman 6-n-propyl-8-(2-pipecolinomethyl)-chroman 5-n-hexyl-7-(2-pipecolinomethyl)-coumaran 2,2-dimethyl-5-(2-pipecolinomethyl)-coumaran 2-methyl-6-n-butyl-9-(2-pipecolinomethyl)-chroman 6-ethyl-8-(4-n-propylpiperidinomethyl)-chroman 2-methyl-(4-ethylpiperidinomethyl)-4,5-benzochroman 7-(3-pipecolinomethyl)-5,6-benzochroman As will be apparent from inspection of the formula set out above, the new compounds contain a basic nitrogen atom, and therefore possess the property of forming acid addition salts. The new compounds and their acid addition salts have utility as oxytocics; that is, they exert on uterine muscle an action of the type produced by the oxytocic ergot alkaloids. They can be administered orally or parenterally in the form of aqueous solutions, or dispersions in suitable pharmaceutical diluents.

The compounds of this invention are prepared by alternative condensation methods described below. In the description and formulas to follow, R, $R_1$, $R_2$ and $n$ have the same significance as set forth hereinabove, and X represents one of the halogens chlorine, bromine, and iodine.

*Method A.*—A Grignard-type reagent is prepared from magnesium or lithium and a chroman or coumaran having the desired R and $R_2$ substituents, and chlorine, bromine or iodine positioned in the benzene ring portion of the molecule. The reagent is then reacted in anhydrous ether solution with an N-ether derivative of piperidine which is substituted with an $R_1$ substituent. The reaction mixture is poured over a mixture of ice and mineral acid. The substituted piperidinomethyl-benzooxaheterocyclic compound formed in the reaction dissolves in the aqueous phase in the form of its mineral acid addition salt. The compound is isolated by the addition of alkali, extraction with ether and fractional distillation of the ethereal extract. The reactions involved in the synthesis are illustrated by the following equations, in which R, $R_1$, $R_2$ and $n$ have the same significance as heretofore:

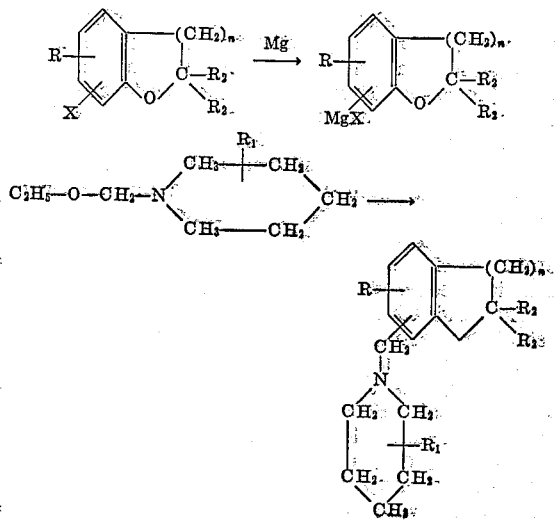

*Method B.*—One equivalent of an appropriately substituted coumaran or chroman containing a carboxyaryl halide group in the benzene ring is treated with two equivalents of a substituted piperidine in an inert solvent to produce the corresponding substituted piperidinomethyl-benzooxaheterocyclic compound. The halide salt of the substituted piperidine, formed as a by-product in the reaction together with the solvent in which the reaction was carried out are removed from the reaction mixture by washing and evaporation, and the residue comprising the piperidinomethylbenzooxaheterocyclic compound is dissolved in anhydrous ether and treated with lithium aluminum hydride to reduce the keto group of the compound to a methylene group. The reaction mixture is treated with water to destroy excess lithium aluminum hydride, and is extracted with dilute acid, thereby obtaining an acidic aqueous solution of the substituted piperidinomethylbenzooxaheterocyclic compound. The compound is recovered from the acidic aqueous solution by making the solution alkaline, extracting the alkaline mixture with a water-immiscible solvent, and fractionally distilling the extract. The reactions involved in the synthesis are illustrated by the following equation:

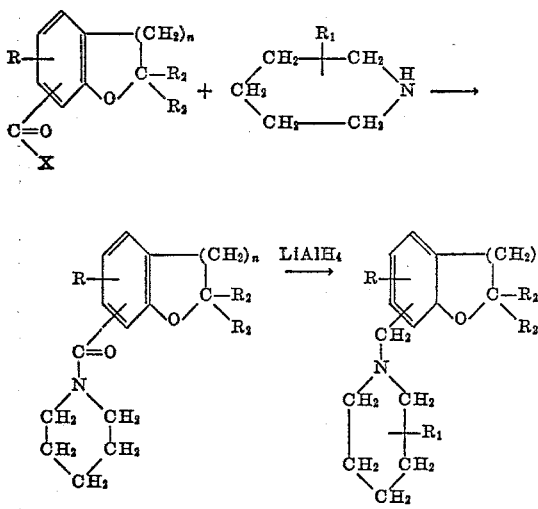

Included within the scope of this invention are the nontoxic salts of the new basic compounds. By the term "nontoxic salts" as used herein is means those salts formed with acids which do not materially increase the toxicity of the basic compounds, and which are useful for pharmaceutical purposes. Examples of such salts are acid addition salts with inorganic or mineral acids, as for example, with hydrochloric, hydrobromic, hydriodic, nitric, phosphoric and sulfuric acids. Also included within the meaning of the term are acid addition salts with organic acids, such as, for example, benzoic, salicyclic, lactic, succinic, citric, sulfamic, thiosalicyclic, tartaric, maleic, stearic and acetic acids.

The acid addition salts of the new bases are readily prepared by methods known to the art, such as, for example, by reacting stoichiometric amounts of the desired acid and the desired base in a mutual solvent, and evaporating the solvent, whereupon the desired acid addition salt is recovered as the residue.

The following specific examples further illustrate this invention.

*Example 1*

2,5-dimethyl-7-(2-pipecolinomethyl)-coumaran.

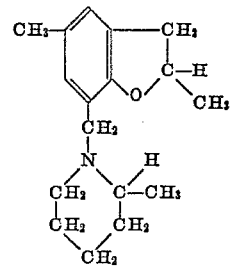

A solution of 35 g. (0.237 mol) of 2,5-dimethylcoumaran and 19.5 g. (0.237 mol) of sodium acetate in 100 cc. of glacial acetic acid was cooled in an ice bath while 37 g. (0.237 mol) of bromine were added. The reaction mixture was poured into 300 cc. of water, whereupon 7-bromo-2,5-dimethylcoumaran formed in the reaction separated as an oil. The oil was extracted with ether, the ether extract was washed with water and dried over magnesium sulfate. The dry ether extract was fractionally distilled, and the 7-bromo-2,5-dimethylcoumaran boiled at 104–106° C. at a pressure of 0.6 mm. of mercury. The refractive index was as follows: $n_D^{25}=1.5467$. Analysis showed the presence of 35.43 percent of bromine as compared with the calculated amount of 35.19 percent.

A mixture containing 22.7 g. (0.1 mol) of 7-bromo-2,5-dimethylcoumaran, 2.08 g. (0.3 mol) of lithium in small pieces, and 125 cc. of anhydrous ether, was refluxed for about one hour. A solution of 15.7 g. (0.1 mol) of 2-pipecolinomethylethyl ether in 50 cc. of anhydrous ether was then added, and the reaction mixture was refluxed for about four hours. The reaction mixture was poured over 500 g. of ice mixed with 25 cc. of hydrochloric acid. The resulting mixture was made basic with sodium hydroxide, and the oil which separated was extracted with ether. The ethereal extract, containing the 2,5-dimethyl-7-(2-pipecolinomethyl)-coumaran formed in the reaction was washed with water and dried over anhydrous magnesium sulfate. The ether was removed by evaporation, and the residue was purified by fractional distillation in vacuo.

2,5-dimethyl-7-(2-pipecolinomethyl)-coumaran boiled at 140–144° C. at a pressure of 0.5 mm. of mercury. Analysis showed the presence of 78.66 percent of carbon, 9.56 percent of hydrogen, and 5.53 percent of nitrogen as compared with the calculated amounts of 78.51 percent of carbon, 9.72 percent hydrogen, and 5.40 percent of nitrogen.

*Example 2*

2,5-dimethyl-7-(2-pipecolinomethyl)-coumaran hydrobromide.

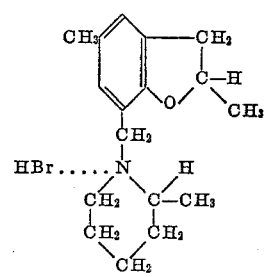

24.7 g. (0.1 mol) of 2,5-dimethyl-7-(2-pipecolinomethyl)-coumaran were dissolved in 100 cc.

of anhydrous ether, and dry hydrogen bromide was passed into the solution until precipitation was complete. The precipitate comprising the hydrobromic acid addition salt of 2,5-dimethyl-7-(2-pipecolinomethyl)-coumaran was filtered off, washed with ether, and recrystallized from ethyl acetate-methanol-ether solution.

2,5 - dimethyl - 7 - (2 - pipecolinomethyl) - coumaran hydrobromide thus prepared melted at 163–165° C. Analysis showed the presence of 4.13 percent of nitrogen and 23.20 percent of bromine as compared with the calculated amounts of 4.12 percent of nitrogen and 23.49 percent of bromine.

*Example 3*

2-methyl-5-(2-pipecolinomethyl)-coumaran.

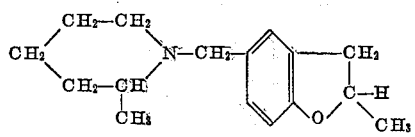

A mixture of 9.0 g. (0.051 mol) of 2-methyl-coumaran-5-carboxylic acid and 20 cc. of thionyl chloride was allowed to stand at room temperature for about one hour and was then refluxed for about fifteen minutes. The excess thionyl chloride was removed by evaporation in vacuo, and 10 g. (0.1 mol) of 2-pipecoline dissolved in 50 cc. of benzene were added to the residual oil. The reaction mixture was washed with water and evaporated to dryness in vacuo. The residue from evaporation was dissolved in 100 cc. of anhydrous ether and added dropwise to a solution of 1.9 g. (0.05 mol) of lithium aluminum hydride in 100 cc. of anhydrous ether. The reaction mixture was refluxed for about two hours and thereafter excess lithium aluminum hydride was decomposed by the addition of 20 cc. of water. The ether layer was decanted and extracted with five percent aqueous hydrochloric acid. The acidic aqueous extract was made basic with sodium hydroxide, whereupon 2-methyl-5-(2-pipecolinomethyl)-coumaran separated as an oil. The oil was extracted with ether, the ether extract was washed with water and dried over anhydrous magnesium sulfate. The ether was evaporated in vacuo and the residue was distilled under reduced pressure.

2 - methyl - 5 - (2 - pipecolinomethyl) - coumaran boiled at 151–153° C. at a pressure of 1.0 mm. of mercury. The refractive index was as follows: $n_D^{25}=1.5338$. Analysis showed the presence of 78.47 percent of carbon, 9.52 percent of hydrogen and 5.91 percent of nitrogen as compared with the calculated amounts of 78.34 percent of carbon, 9.45 percent of hydrogen and 5.71 percent of nitrogen.

*Example 4*

2 - methyl - 5 - (2 - pipecolinomethyl) - coumaran hydrobromide.

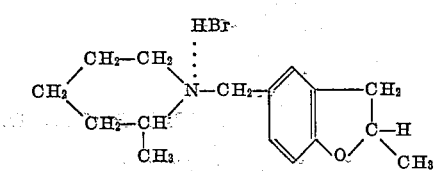

The procedure of Example 2 was followed, except that 23.3 g. (0.1 mol) of 2-methyl-5-(2-pipecolinomethyl)-coumaran were used.

2 - methyl - 5 - (2 - pipecolinomethyl) - coumaran melted at 218–220° C. Analysis showed the presence of 4.48 percent of nitrogen and 24.63 percent of bromine as compared with the calculated amount of 4.29 percent of nitrogen and 24.49 percent of bromine.

*Example 5*

2,2,6 - trimethyl - 8 - (2 - pipecolinomethyl)-chroman hydrochloride.

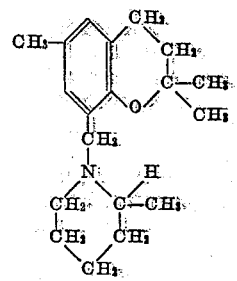

The procedure of Example 1 was followed, except that 2,2,6-trimethylchroman was brominated to form 8-bromo-2,2,6-trimethylchroman boiling at 117–120° C. at a pressure of 0.7 mm. of mercury. Analysis of the 8-bromo-2,2,6-trimethyl-chroman thus prepared showed the presence of 56.74 percent carbon, 5.80 percent of hydrogen, and 31.08 percent of bromine, as compared with the calculated amounts of 56.47 percent of carbon, 5.79 percent of hydrogen, and 31.32 percent of bromine. The lithium derivative of 8-bromo-2,2,6-trimethylchroman was prepared and reacted with 2-pipecolinomethyl ethyl ether in ether solution according to the procedure of Example 1.

2,2,6- trimethyl-8- (2-pipecolinomethyl) - chroman boiled at 152–154° C. at a pressure of 0.5 mm. of mercury. The refractive index was as follows: $n_D^{25}=1.5245$. Analysis showed the presence of 79.05 percent of carbon, 10.51 percent of hydrogen and 5.00 percent of nitrogen as compared with the calculated amounts of 79.40 percent of carbon, 10.17 percent of hydrogen and 4.87 percent of nitrogen.

*Example 6*

2-methyl- 7-(2- pipecolinomethyl) - 4,5- benzocoumaran.

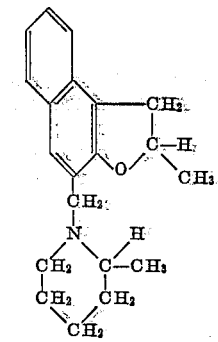

A mixture of 2 g. of pyridine hydrochloride and 21 g. of methyl-1-allyl-2-hydroxynapthoate was heated to 250° C. for about two hours. The reaction mixture was cooled and washed with ether, the ether solution was washed with five percent aqueous sodium hydroxide solution, and dried over magnesium sulfate. The ether solution was evaporated in vacuo leaving an oily residue comprising methyl 2-methyl-4,5-benzocoumaran-7-carboxylate. The residue after crystallization from petroleum ether melted at about 105–106° C.

Analysis showed the presence of 74.41 percent of carbon and 6.15 percent of hydrogen, as compared with the calculated amounts of 74.35 percent of carbon and 5.82 percent of hydrogen.

The methyl 2-methyl-4,5-benzocoumaran-7-carboxylate was dissolved in 50 cc. of 50 percent ethanol containing 5 g. of sodium hydroxide. The ester was hydrolyzed by gently warming the mixture for 2 hours. The mixture was acidified with five percent aqueous hydrochloric acid and cooled, whereupon 2-methyl-7-carboxy-4,5-benzocoumaran separated in crystallized form. The carboxy compound was purified by recrystallizing it from ethanol-water solution whereupon it melted at about 177–179° C. Analysis showed the presence of 73.75 percent of carbon and 5.60 percent hydrogen, as compared with the calculated amounts of 73.68 percent of carbon and 5.30 percent of hydrogen.

The carboxy compound was converted to the corresponding acid chloride by treatment with thionyl chloride according to the procedure of Example 3. The addition of 2-pipecoline to the acid chloride followed by reduction in accordance with the procedure of Example 3 resulted in the formation of 2-methyl-7-(2-pipecolinomethyl)-4,5-benzocoumaran. Solution of the coumaran in ether and saturation of the solution with dry hydrogen chloride to form the hydrochloric acid addition salt of 2-methyl-7-(2-pipecolinomethyl)-4,5-benzocoumaran. The salt melted at about 195–197° C. Analysis showed the presence of 4.28 percent of nitrogen and 10.51 percent of chlorine as compared with the calculated amounts of 4.22 percent of nitrogen and 10.68 percent of chlorine.

I claim:

1. A member of the group consisting of a benzooxaheterocyclic base and its acid addition salts, said base being represented by the formula

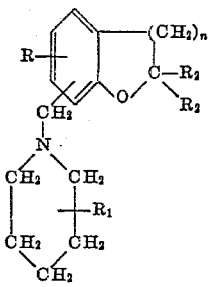

wherein R represents a substituent in the benzene ring, of the group consisting of a lower alkyl radical and a benzo grouping; $R_1$ represents a lower alkyl radical; $R_2$ represents a member of the group consisting of hydrogen and a methyl radical; and $n$ is one of the integers 1 and 2.

2. A compound represented by the formula

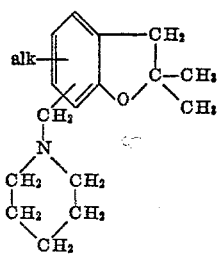

wherein alk represents a lower alkyl radical.

3. A compound represented by the formula

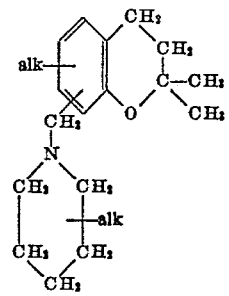

wherein alk represents a lower alkyl radical.

4. 2,5-dimethyl-7-(2-pipecolinomethyl)-coumaran, represented by the formula

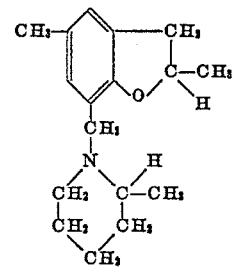

5. 2-methyl-5-(2-pipecolinomethyl)-coumaran, represented by the formula

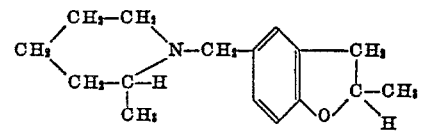

6. 2,2,6-trimethyl-8-(2-pipecolinomethyl)-chroman represented by the formula

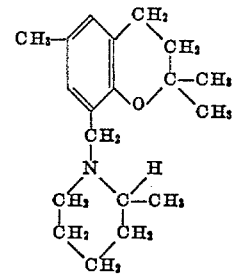

7. 2-methyl-7-(2-pipecolinomethyl)-4,5-benzocoumaran represented by the formula

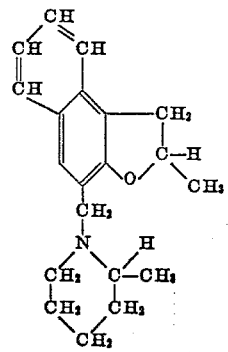

ALBERT POHLAND.

REFERENCES CITED

The following references are of record in the file of this patent:

Burger et al.: J. Am. Chem. Soc., vol. 67, pp. 566–669 (1945).